United States Patent
Wandeler et al.

(10) Patent No.: US 7,328,112 B2
(45) Date of Patent: Feb. 5, 2008

(54) METHOD FOR OPERATING A MAGNETO-INDUCTIVE FLOW METER

(75) Inventors: Frank Wandeler, Baden-Dättwil (CH); Markus Ruefenacht, Dornach (CH)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 11/365,510

(22) Filed: Mar. 2, 2006

(65) Prior Publication Data
US 2006/0201258 A1 Sep. 14, 2006

(30) Foreign Application Priority Data
Mar. 2, 2005 (DE) .................. 10 2005 010 166

(51) Int. Cl.
*G01F 1/00* (2006.01)
(52) U.S. Cl. .......................... 702/45; 702/100
(58) Field of Classification Search ................ 702/100, 702/45; 73/861.11, 861.12, 861.13, 861.14, 73/861.15, 861.16, 861.17
See application file for complete search history.

(56) References Cited

U.S. PATENT DOCUMENTS

| | | |
|---|---|---|
| 4,370,892 A | 2/1983 | Schmoock |
| 5,621,177 A * | 4/1997 | Torimaru ............. 73/861.16 |
| 6,453,272 B1 | 9/2002 | Slechta |

FOREIGN PATENT DOCUMENTS

| | | |
|---|---|---|
| DE | 38 11 946 A1 | 10/1989 |
| DE | 102 56 103 A1 | 12/2003 |
| EP | 1 202 031 A1 | 5/2002 |
| EP | 1 217 337 | 6/2002 |
| JP | 03135730 A | 6/1991 |
| JP | 2004 093525 | 3/2004 |

* cited by examiner

Primary Examiner—John Barlow
Assistant Examiner—Stephen J Cherry
(74) Attorney, Agent, or Firm—Bacon & Thomas, PLLC

(57) ABSTRACT

A method of operating a magneto-inductive flow meter in which the damping constant for processing of measurement signal values is automatically increased during a cleaning procedure, in order that, during the cleaning procedure, the amount of the used cleaning medium can be easily determined, despite increased fluctuation in the measurement signal values.

7 Claims, 2 Drawing Sheets

METHOD FOR OPERATING A MAGNETO-INDUCTIVE FLOW METER

FIELD OF THE INVENTION

The invention relates to a method for operating a magneto-inductive flow meter.

BACKGROUND OF THE INVENTION

Magneto-inductive flow meters utilize the principle of electrodynamic induction for measuring volume flow rate. Charge carriers of the medium moved perpendicularly to a magnetic field induce a voltage in measuring electrodes likewise arranged essentially perpendicularly to the flow direction of the medium. This induced voltage is proportional to the flow velocity of the medium averaged over the cross section of the pipe; it is thus proportional to volume flow rate.

A magneto-inductive flow meter is manufactured and sold by the firm of Endress+Hauser under the label Promag 53.

Magneto-inductive flow meters are used in many ways in the food and pharmaceutical industries. Especially in these applications, a regular cleaning of the entire measuring system composed of the flow meter, including the pipelines, is necessary. One possibility for the cleaning is to uninstall the measuring device from the pipeline system and, following deinstallation, clean it separately. This method of cleaning is very complicated for the user and, to some extent, not even practical. Recently, a technique for cleaning has become preferred, in the case of which a deinstallation of the measuring device is no longer necessary. This method of cleaning is known in automation technology under the label CIP (Clean in Place). For such a method, in particular cases, strict regulations have been put in place by the pertinent authorities (e.g., FDA, Food and Drug Administration). A CIP (Clean in Place) method involves sending a cleaning liquid through the measuring system. The cleaning liquid effects an appropriate cleaning of the measuring device including the pipeline system.

Due to the different physical properties of the cleaning medium in comparison to the medium being measured, considerable fluctuations in the measurement signal can arise. In the face of such fluctuations, measured values can no longer be reliably obtained. The summing of the measured values in a totalizer is no longer possible. Individual measured values, so called outliers, can completely corrupt the results of the totalizing.

As a rule, an evaluation electronics is only designed for a medium being measured, that remains the same, with constant physical characteristics.

One possibility for avoiding the problems arising in the cleaning process, is to blank out the measurement signal during the cleaning process. This could be done over a fixedly predetermined time interval. A fixedly predetermined time interval is, however, impractical since the duration of the cleaning process depends on the specific application, and, consequently, can have varying lengths. The time interval would, therefore, have to be adjustable manually, this being an extremely inconvenient matter for the user.

A further disadvantage, which results from blanking out of the measurement signal during the cleaning process, is that there then has been no opportunity to determine the amount of cleaning liquid used. Frequently, it is desired, or even required by regulation, to keep the amount of the cleaning liquid being used likewise constant. In this way, it can be proved that the cleaning procedure was performed according to regulation. For this determination, however, additional equipment would be necessary.

SUMMARY OF THE INVENTION

An object of the invention is to provide a method for operating a magneto-inductive flowmeter not exhibiting the above referenced disadvantages and enabling a practical measurement of volume flow when using a cleaning liquid.

An essential idea of the invention is to provide different damping constants during the processing of the digital, measured signals. During operation with the normal medium being measured, the measurement signals are processed in a digital filter with a small amount of damping. This permits a relatively rapid reaction to changes, e.g. in the context of control systems. Thus, frequently, magneto-inductive flowmeters are used in the field of process automation technology to serve as components of a control system.

During operation with a cleaning liquid, a larger damping constant is chosen. Due to the larger amount of damping, the measurement system does, it is true, become slower to react, but rapid measured value fluctuations are in this way lessened so that a usable measurement result can be obtained.

Switching between the two damping constants occurs automatically in an embodiment of the invention. To this end, a typical fluctuation interval for the measurement signal values is determined. Stated pictorially, the fluctuation interval can be viewed as a band in which the measured values normally lie. The wider the band is chosen to be, the more unlikely it is that a measurement signal value lies outside of the band. If the volume flow rate increases, then the band, naturally, follows the current average value of the measurement.

If a plurality of measurement signal values lie above the fluctuation interval and simultaneously a plurality of measurement signal values lie beneath the typical fluctuation interval, then this is a strong indication that the measurement signal fluctuations have considerably increased, and consequently a switching to the larger damping constant has become necessary. Once in this mode, it is assured that a sudden change of the measurement signal, e.g. increasing volume flow rate, will not lead to switching.

By removing measurement signal values lying outside of a maximum measurement range interval, the measurement results are further improved, since outliers are then no longer taken into consideration.

For the number of measurement signal values, which must lie above or beneath the typical fluctuation interval, the value 3 has been found to be satisfactory.

Advantageously, the filter is an IIR (infinite impulse response) filter.

A typical fluctuation interval width is +/−3 standard deviations. It is extremely unlikely that in a given time interval there will be simultaneously a plurality of measurement signal values outside of the fluctuation interval and, in fact, both above the upper limit value of the fluctuation interval as well as beneath the lower limit value of the fluctuation interval.

BRIEF DESCRIPTION OF THE DRAWINGS

The invention will now be explained in greater detail on the basis of an example of an embodiment illustrated in the drawing, the figures of which show as follows.

DESCRIPTION OF THE PREFERRED EMBODIMENTS

Figure 1:
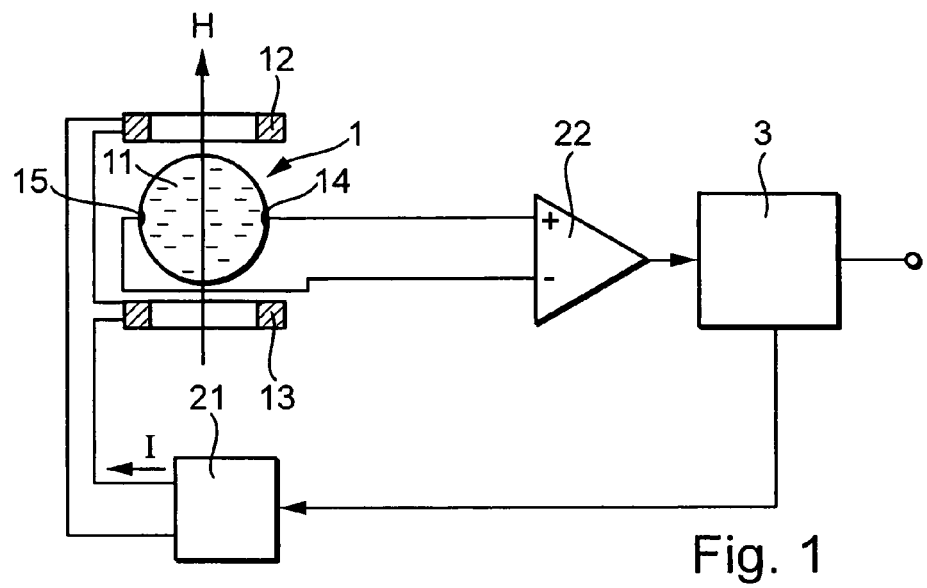
FIG. 1 is a schematic illustration of a magneto-inductive flowmeter.

FIG. 1 shows, schematically, a magneto-inductive flowmeter 1, which comprises the actual magneto-inductive sensor and an evaluation unit 3. The sensor includes a measuring tube 11 in which the medium to be measured flows, a magnet arrangement including two field coils 12, 13 for producing a magnetic field and, preferably, two opposing measurement electrodes 14, 15. The field coils 12, 13 are fed by a driver electronics 21, which is activated by an evaluation circuit 3.

The measurement electrodes 14, 15 are connected via a difference amplifier 22 with the evaluation circuit 3. The difference amplifier 22 delivers the actual measurement signal u, which is then evaluated in the evaluation circuit 3. The evaluation occurs in usual manner, digitally. To this end, the measurement signal u is digitized in an A/D converter and evaluated in a microcontroller. By the digitizing, the analog measurement signal u is converted into a series of measurement signal values, which are processed in the microcontroller.

Figure 2:
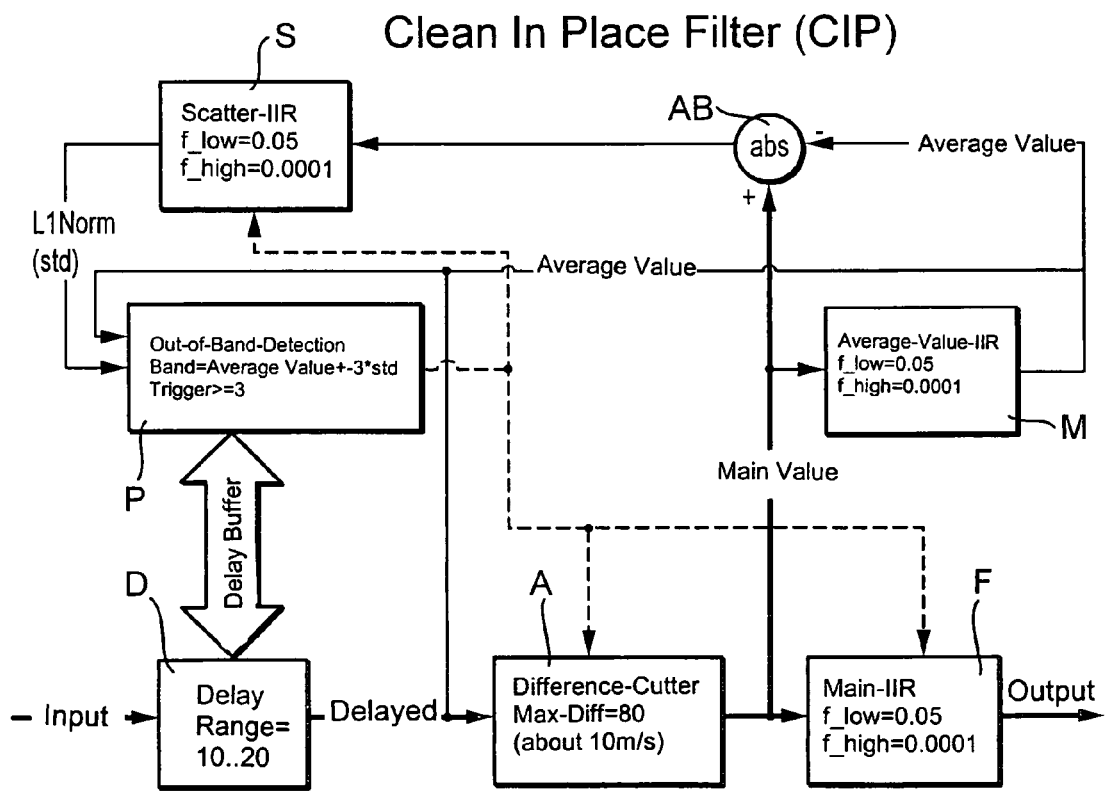
FIG. 2 is a block diagram of the signal processing.

The method of the invention will now be explained in greater detail on the basis of the block diagram of FIG. 2. As already mentioned, under certain conditions (cleaning procedure), strong fluctuations in the measurement signal can arise. These fluctuations are caused essentially by the conductivity jumps occurring when the medium changes. For instance, beer possesses a different conductivity than a CIP cleaning medium.

The digitized measurement signal values are fed to a delay unit D. In the delay unit D, the measurement signal values are temporarily stored and delayed by an adjustable delay time, which lies between 10 and 20 digitizing steps. A typical value for a single digitizing step is 60 milliseconds. This value depends on, among other things, the diameter of the measuring tube.

The delayed measurement signal values are fed to a cutoff unit A. In normal operation, the cutoff unit A has no effect on the measurement signal values. The measurement signal values leave the cutoff unit A unchanged. The functioning of the cutoff unit A will be detailed, therefore, later.

After the cutoff unit A, the measurement signal values are fed to a digital filter unit F. The digital filter unit F works normally with a damping constant D1. Filter unit F can be e.g. an IIR (infinite impulse response)-filter IIR with f_low=0.5 as damping constant D1. Under certain conditions, which will be explained in greater detail later, the damping constant is changed to a value D2 (f_high=0.005).

In an averaging unit M, the average value of the measurement signal values is determined.

The average values and the measurement signal values are subtracted from one another in a unit AB and the absolute values of the differences are fed to a standard deviation unit S.

In the standard deviation unit S, the standard deviation of the measurement signal values from the average value is determined.

Both units work in each case as filters with two different filter constants D1' and D2'. Also, in this case, it is useful to apply an IIR filter.

The values for D1' correspond to f_low=0.05 and those for D2' correspond to f_high=0.0001.

In a testing unit P, the condition B is tested whether, in a predetermined time interval, more than a present number A1 of measurement signal values lie above the upper-limit value of the fluctuation interval and simultaneously a number A2 of measurement signal values lie below the lower limit value of the fluctuation interval. For the predetermined time interval of 10 measurement signal values, 3 has proven to be a practical value for the numbers A1 and A2.

The upper and lower limit values of the fluctuation interval are determined via the average value +/−3 standard deviations. The measurement signal values normally lie within this fluctuation interval.

When it is determined in the testing unit P that the condition B is fulfilled, then the damping constant for the filter F is switched from D1 to D2. Simultaneously, in the averaging unit M and in the standard deviation unit S, the filter constants D1' are changed to D2'. With this adjustment, reliable measurement results can then be produced even in the case where a cleaning liquid is being used.

Additionally, in the cutoff unit A, all measurement signal values, which lie outside of a maximum measurement range interval, are cut off, i.e. the measurement signal values are limited to the range average value +/− maximum value (max-diff). A typical value for the maximum value is 10 m/s. This measure leads to a further improvement of the measurement results because completely impossible measurement signal values are suppressed.

By the condition B, it is possible to determine automatically whether the normal medium being measured is flowing through the magneto-inductive flowmeter 1, or, instead, the cleaning liquid is flowing. By the switch-over to a higher damping constant in the measurement signal processing, it is possible even in the case of a cleaning procedure to obtain reliable measured values. Consequently, the amount of cleaning liquid used can be easily determined and consequently such information can be retained for later review.

As long as condition B is fulfilled, constants (damping constant, filter constant) appropriate for the cleaning liquid are used.

If the condition B is no longer fulfilled, then the constants are set back to their original values and normal measurement operation can proceed further. Also this switch-over happens automatically.

Figure 3:
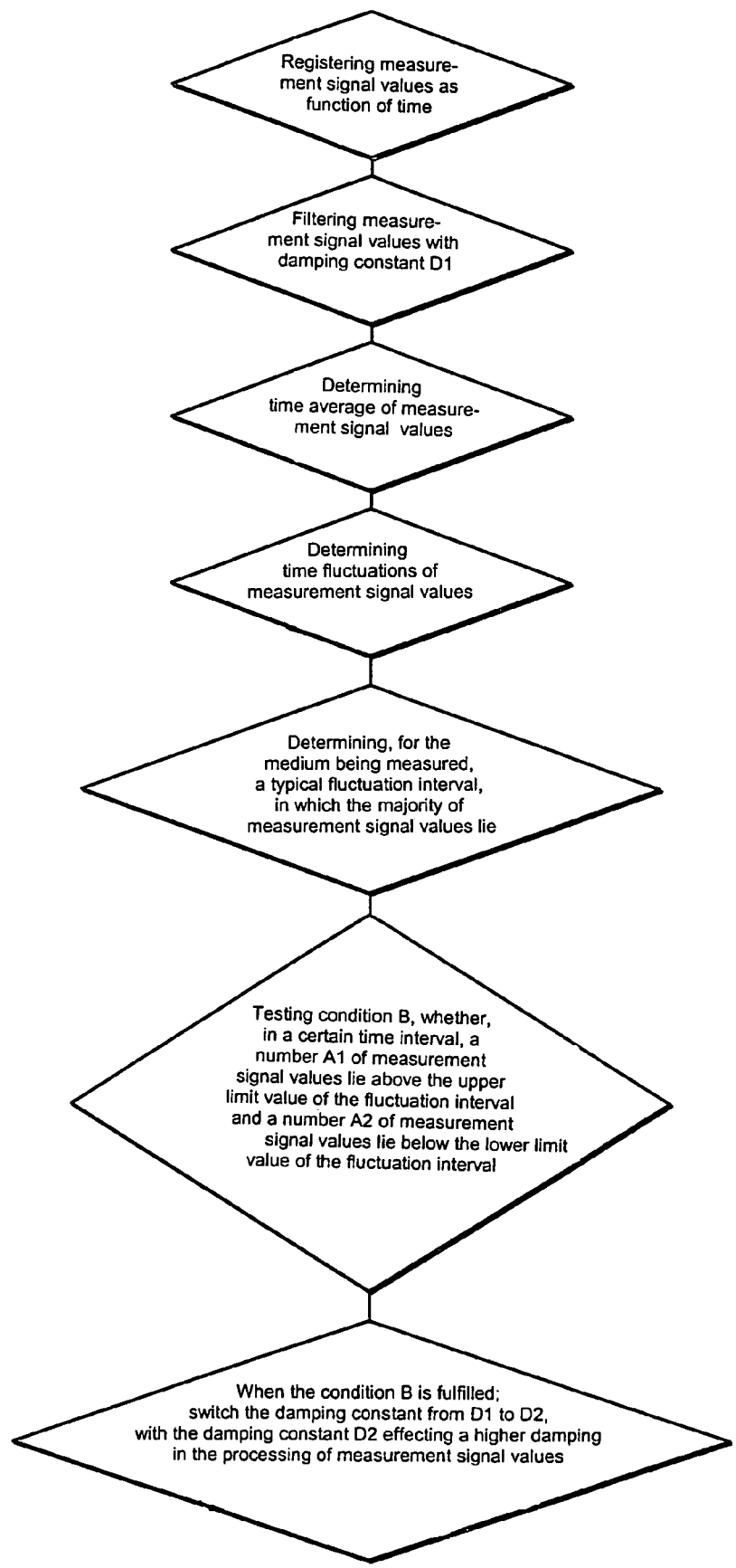
FIG. 3 is a flow diagram of a method of the invention.

FIG. 3 shows again individual method steps of the method of the invention.

The invention claimed is:

1. A method of operating a magneto-inductive flow meter, comprising the steps of:

registering measurement signal values as a function of time;

filtering said measurement signal values with a damping constant D1;

averaging said measurement signal values with respect to time;

determining fluctuations of said measurement signal values with respect to time;

determining, for a medium being measured, a typical fluctuation interval, in which a majority of said measurement signal values lies;

testing a condition B, whether, in a predetermined interval of time, a number A1 of said measurement signal values lie above an upper limit value of the fluctuation interval and a number A2 of said measurement signal values lie below a lower limit value of the fluctuation interval; and when the condition B is fulfilled switching from the damping constant D1 to a damping constant D2, wherein the damping constant D2 effects a higher damping for filtering of said measurement signal values.

2. The method as claimed in claim 1, wherein:
said measurement signal values are, before they are filtered, limited to a maximum measurement range interval; and measurement signal values, which lie outside of the maximum measurement range interval, are replaced by the corresponding upper and lower limit values of said maximum measurement range interval.

3. The method as claimed in claim 1, wherein:
the numbers A1 and A2 are, in each case, 3.

4. The method as claimed in claim 1, wherein:
when the condition B is no longer fulfilled, a switching from the damping constant D2 to the damping constant D1 occurs.

5. The method as claimed in claim 1, wherein:
the fluctuation interval is +/−3 standard deviations wide.

6. The method as claimed in claim 1, wherein:
the filtering is performed, in each case, in an IIR-filter.

7. The method as claimed in claim 1, wherein:
as long as condition B is fulfilled, it is concluded that a cleaning liquid is present, and the amount of the cleaning liquid is determined during such period of time.

* * * * *